Oct. 2, 1956 K. H. HACHMUTH 2,764,878
MULTI-STAGE CRYSTALLIZATION PROCESS AND APPARATUS
Filed Dec. 4, 1952 3 Sheets-Sheet 1
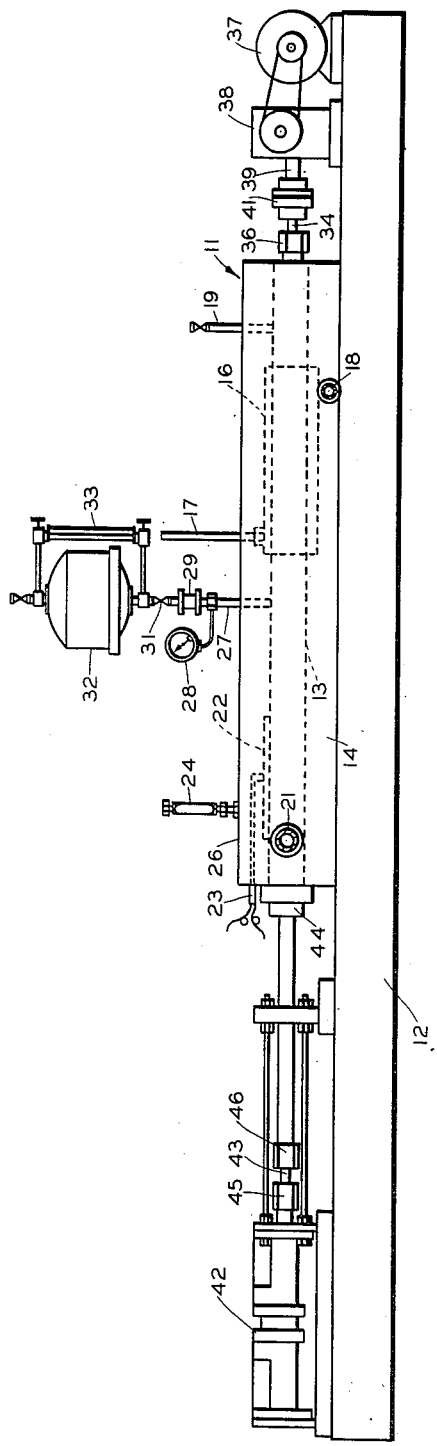
INVENTOR.
K. H. HACHMUTH
BY Hudson & Young
by Kenneth E. Prince
ATTORNEYS Oct. 2, 1956 K. H. HACHMUTH 2,764,878
MULTI-STAGE CRYSTALLIZATION PROCESS AND APPARATUS
Filed Dec. 4, 1952 3 Sheets-Sheet 2

INVENTOR.
K. H. HACHMUTH
ATTORNEYS

Oct. 2, 1956 K. H. HACHMUTH 2,764,878
MULTI-STAGE CRYSTALLIZATION PROCESS AND APPARATUS
Filed Dec. 4, 1952 3 Sheets-Sheet 3

INVENTOR.
K. H. HACHMUTH
BY Hudson & Young
by Kenneth E. Prince
ATTORNEYS

United States Patent Office 2,764,878
Patented Oct. 2, 1956

2,764,878

MULTI-STAGE CRYSTALLIZATION PROCESS AND APPARATUS

Karl H. Hachmuth, Bartlesville, Okla., assignor to Phillips Petroleum Company, a corporation of Delaware Application December 4, 1952, Serial No. 324,110

22 Claims. (Cl. 62—124)

This invention relates to the separation of mixtures of compounds by crystallization. In one of its more specific aspects, it relates to the multi-stage crystallization of mixtures of compounds. In another specific aspect, it relates to the separation of solid solution-forming mixtures into their components. In another specific aspect, it relates to the purification of compounds by crystallization. In another specific aspect, it relates to a method of accelerating the approach towards equilibrium between a crystallized material and its mother liquor. In still another specific aspect, it relates to an apparatus for carrying out such separations.

This application is a continuation-in-part of my application Serial No. 110,354, filed August 15, 1949, now abandoned.

When crystals are frozen from a mother liquor comprising a mixture of compounds which do not form solid solutions, it is theoretically possible to attain pure material by a single crystallization. Actually, the crystals separating from partially frozen mixtures usually give a melt that is far from pure. This is particularly true in the case of hydrocarbons or other organic compounds, and is due to the entrapment of mother liquor by the fine, often fibrous crystals. This mother liquor is held tenaciously and is not easily separated. Pressing, vacuum filtration or centrifuging may remove a portion.

When the components of a mixture form solid solutions, it is not possible, either theoretically or actually, to obtain a pure material by one crystallization. In such cases, the crystals separating from such a mixture do not have the same composition as the mother liquor. The material so crystallized is a mixture of the components present, the ratio depending on the composition of the starting material and on the equilibrium characteristics for the particular system. The crystals will be richer with respect to the higher-melting component of the mixture than the liquid from which those crystals were solidified.

If equilibrium between the crystals separating from a mixture of solid solution-forming components and the remaining liquid could be easily attained, then separation of the components could be obtained by moving the crystals countercurrently to a liquid which becomes increasingly richer with respect to that component tending to be preferentially removed by freezing. The crystals reaching the end would be substantially pure. At least a portion of the crystals would be melted and the melt returned countercurrently to the moving crystals while the remaining crystals would be removed as product. At the opposite end of such a crystallizer, cooling could be applied to generate the crystals; the unfrozen liquid would be removed as the pure, less-easily frozen fraction of the original mixture. The crystals formed would always be moved towards the warmer end of the crystallizer. While such a process is theoretically possible, its efficiency is disappointingly low. This is due to the length of time required for the solid and remaining liquid to reach equilibrium.

Resort to alternate partial or complete melting and freezing is usually the result of attempts to obtain pure products by countercurrent continuous crystallization. In such a process, the energy requirements and amount of heat transfer required are inordinately large because the heat of crystallization must be added and removed many times throughout the process.

I have discovered a method by which it is possible to obtain the advantages of alternate melting and freezing without the disadvantages of large heat exchange surfaces and large heat transfers during the process. Instead of adding and abstracting heat to melt and freeze the crystallizable material, I alternately reduce and increase the pressure on the mixture.

The principal object of my invention is to provide a means of separating mixtures of compounds by crystallization.

Another object is to provide a method of removing the excess saturating component from a eutectic-forming mixture.

Still another object is to provide a method of accelerating the approach towards phase equilibrium between a crystallized solid and surrounding liquor.

Still another object is to provide an apparatus for the efficient separation of mixtures into their components by crystallization.

Other objects and advantages of the invention will be apparent from the following description, drawings and disclosure.

In the drawings:

Figure 1 is an elevational view of a preferred modification of my pressure crystallizer.

Figure 2 is a cross sectional view of one end of my pressure crystallizer, showing the piston for increasing the pressure on a body of liquid confined within.

Figure 3:
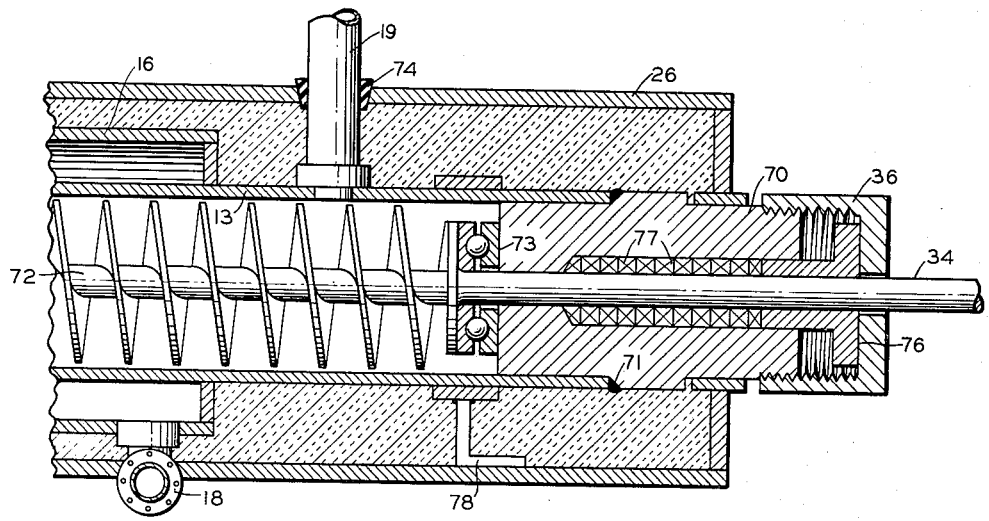
Figure 3 is a cross sectional view of the low temperature end of my crystallizer showing the cooling jacket and means for moving the crystallized material through the apparatus.

In Figure 1 the crystallization apparatus, generally designated as 11, is shown as having a base 12. A combined crystallizing and melting chamber 13 is shown surrounded by insulation 14. Cooling jacket 16 surrounds a portion of the crystallizing zone and has a refrigerant inlet 17 and a refrigerant outlet 18. Product take off line 19 is provided in the low temperature end of said crystallizer and product take off line 21 is provided in the high temperature or melter end of said apparatus. An electrical heater 22 with lead-in wires 23 is shown for heating the melter end of said apparatus. Breather device 24 is provided to admit air to the insulation-filled space between the crystallizer 13 and surrounding case 26. Feed inlet line 27 enters the crystallizer 13 at a point intermediate the ends and is provided with a pressure gauge 28, a check valve 29, a control valve 31, and feed tank 32. Liquid level sight gauge 33 is provided for indicating the level of liquid within tank 32. Shaft 34 of the conveyor screw enters the crystallizer through a packing gland 36. Motor 37 drives speed reducer 38 which, in turn, drives the conveyor shaft through shaft 39 and coupling 41. Air cylinder 42 drives piston 43 which reciprocates within crystallizer 13 to increase and reduce the pressure, as desired. Stuffing boxes 44 and 46 are provided for sealing the apparatus and stuffing box 45 seals the air cylinder.

Figure 2 shows the melter end of crystallizer 13, the surrounding insulation 14 and the outer case 26. Piston 43 is shown passing through stuffing boxes 44 and 46. Stuffing box 44 comprises a flange 51 which is secured to the end of crystallizer 13 by means of weld 52. Piston 43 moves through an outer tube 53 which, with the piston, forms the end closure of tube 13. Flange 54, corresponding to flange 51, is secured to tube 53 by a weld 56. Bolts 57 and 55 are provided for fastening the flanges together to provide a perfect seal. Tube 53 extends a short distance into tube 13 and has an outwardly projecting shoulder for compressing packing 58 against the end of tube 13. As additional sealing, O ring 59 is fitted into annular groove 61 in flanges 51 and 54. On the opposite end of tube 53, sealing is provided by means of packing 62, gland 63 and packing nut 64.

In Figure 3, closure of tube 13 is provided by means of a plug 70 which fits into the end of tube 13 and is secured thereto by means of weld 71. Conveyor shaft 34 passes through said plug and thrust bearing 73 to drive conveyor 72. Product outlet line 19 is secured to tube 13 by a convenient means, such as welding and insulating. Stopper 74 is provided for preventing contact between outlet line 19 and metal shell 26. The end of cooling jacket 16 is shown with its refrigerant outlet 18. Packing nut 36, gland 76, and packing 77 provide a better seal around shaft 34. Tube 13 is shown as being supported in place by means of hangers 78.

Figure 4:
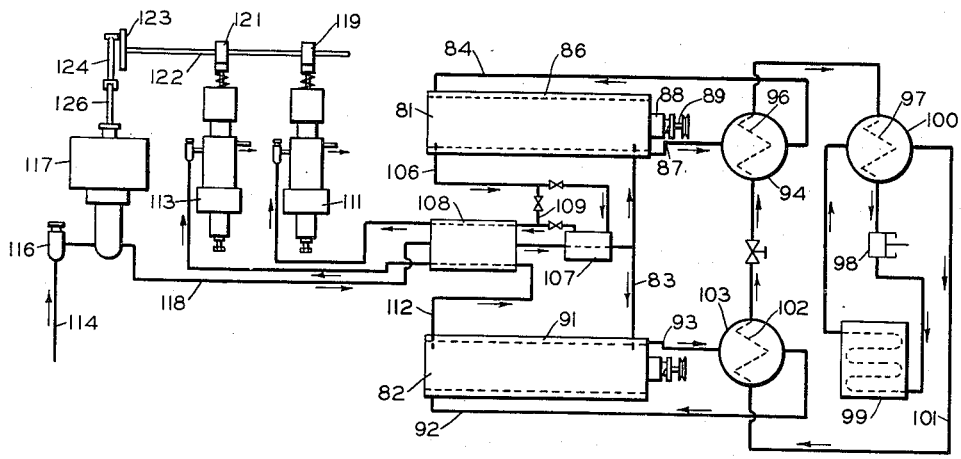
Figure 4 is an elevational view of another modification of my apparatus wherein the separation and melting zones are separate and in which is shown the operation of my feed injector and product take off control.

In Figure 4, crystallizer 81 is shown as being positioned above melter 82 and being joined by a vertical pipe 83. Crystallizer 81 is provided with a refrigerant inlet line 84, cooling jacket 86, and refrigerant outlet line 87. Stuffing box 88 seals the end of crystallizer 81 around conveyor shaft 89. Melter 82 is provided with a heating jacket 91 having an inlet line 92 and outlet line 93 for passing a heat transfer liquid therethrough. For efficient operation of the refrigerating and heating system, the cooling fluid leaving jacket 86 through outlet line 87 is cooled in heat exchanger 94 by evaporating a refrigerant in coil 96. The refrigerant vapor thus generated is heated in exchanger coil 97 with compressed refrigerant, is compressed in compressor 98, water cooled in cooler 99, and passed through heat exchanger 100 in heat exchange relationship with that portion flowing through coil 97, as previously explained. The partially cooled refrigerant flows through line 101 to coil 102 of heat exchanger 103 where it is cooled by heating the heating fluid flowing through exchanger 103. The cooled fluid from coil 102 passes through an expansion valve 104 into coil 96. Crystallizer 81 is provided with a product outlet line 106 which passes through heat exchangers 107 and 108. Heat exchanger 107 may be by-passed by means of a cross-over 109. After passing through heat exchanger 108, product outlet line 106 passes into proportioning valve 111. Product outlet line 112 from melter 82 passes through heat exchanger 108 and thence to proportioning valve 113.

Check valve 116 permits the feed to flow through line 114 into the feed injector and pulsator 117. The feed leaves said injector through line 118, passes through heat exchangers 108 and 107, and then enters the crystallizing and melting system through line 83. The operation of proportioning valves 111 and 113 is synchronized with the operation of said injector and pulsator 117 by means of cams 119 and 121 which are secured to drive shaft 122, on which is a crank 123, and connecting rod 124, which is non-rigidly secured to piston rod 126 of feed injector and pulsator 117.

Figure 5:
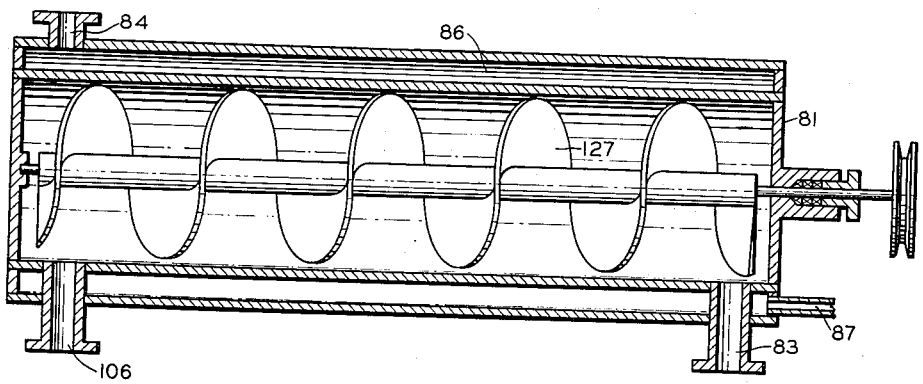
Figure 5 is a cross sectional view of one chamber of a crystallizer or melter as shown in Figure 4.

Figure 5 is a cross sectional view of a crystallizer 81 showing cooling jacket 86, refrigerant inlet 84 and refrigerant outlet 87. A portion of product outlet line 106 is shown. The feed enters this apparatus through feed line 83. The material conveyor 127 is here shown as a screw-type conveyor.

Figure 6:
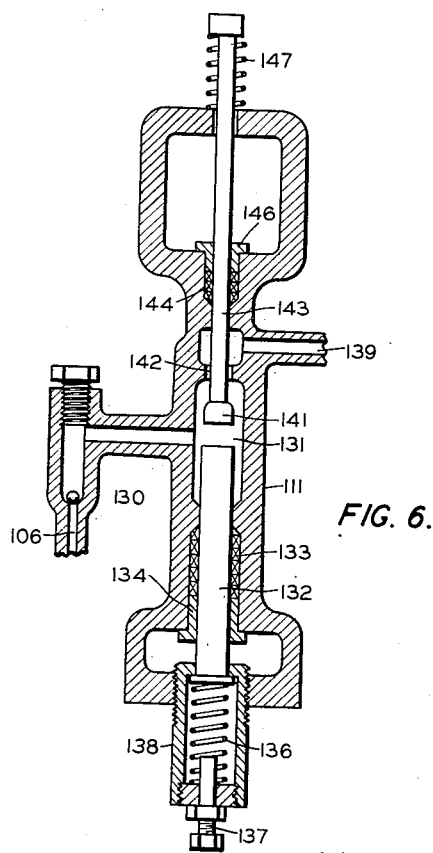
Figure 6 is a cross sectional view of one of the proportioning valves shown in the product take off lines of Figure 4.

In Figure 6, which is a cross sectional view of either proportioning valve 111 or 113, inlet line 106 is provided with a check valve 130. The body of valve 111 has an internal passageway therethrough, a portion of which forms a cylinder 131. A spring actuated piston 132 is slidable within said cylinder and is sealed by means of packing 133 and gland 134. The resistance offered by piston 132 to the flow of liquid into cylinder 131 may be controlled by controlling the tension of spring 136 which is adjustable by set screw 137. The movement of said piston may be controlled by changing the position of adjustable plug 138. The outlet 139 from cylinder 131 is closed by means of a plug 141 which seats itself in opening 142 when shaft 143 rises. Packing 144 and gland 146 provide a seal around shaft 143. Spring 147 holds plug 141 tightly in place. Valve stem 143 is provided with a head at the end opposite plug 141 which holds spring 147 in place and may be engaged by the cam for opening and closing outlet 142.

Figure 7:
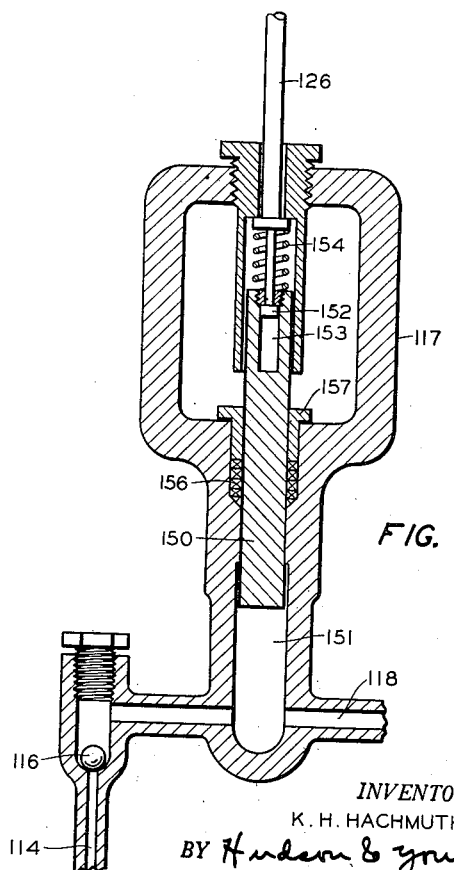
Figure 7 is a cross sectional view of the feed injector and pulsator as shown in Figure 4.

In Figure 7, inlet line 114 leads to check valve 116 and thence into feed injector and pulsator 117, the outlet for which is line 118. Piston 150 is slidable within cylinder 151. Piston rod 126, which is caused to reciprocate by means of a crank and connecting rod previously described, is non-rigidly secured to piston 150 by means of a second piston 152 and cylinder 153, the movement of said second piston within said second cylinder being of limited extent, as shown. Spring 154 forces second piston 152 towards the top of cylinder 153. Packing 156 and gland 157 provide a seal around piston 150 as it reciprocates in cylinder 151.

*Operation*

It has been previously explained that phase equilibrium between crystalline material and liquid containing the same components is not readily attained. For this reason, it is impossible to separate crystals of the theoretically possible purity from a mixture of materials. Consequently, processes for the separation of mixtures by crystallization methods usually comprise a plurality of alternate crystallization and remelting steps. The present processes involving these steps require large amounts of energy and heat transfer. The actual energy and heat transfer requirements are many times the small amounts that are theoretically required.

I have invented a process and apparatus by which it is possible to considerably reduce the energy and heat transfer requirements and still carry out a plurality of alternate melting and freezing steps. The operation of my process is possible because of the phenomenon that is described by Le Chatelier's law which states that if a stress is brought to bear upon a system in equilibrium the equilibrium will be shifted in a direction that will tend to relieve the stress. Another phenomenon which makes possible the operation of my invention is the fact that the volume occupied by a solid is not the same as the volume occupied by an equal weight of the same material in the liquid phase. With certain exceptions, notably water, the volume occupied by a given weight of a chemical compound is greater for the liquid phase than for the solid phase. This means that if a given solid and its mother liquor are in phase equilibrium, the application of pressure to the system will tend to cause the formation of an additional amount of solid. If the pressure is reduced, a portion of the solid will melt to increase the amount of liquid. If the solid and liquid phases are in equilibrium, increasing the pressure and afterward reducing it to the initial value will not result in any change in the amount of solid or the composition of the solid. However, if the solid and liquid are not in equilibrium, increasing the pressure and afterwards reducing it to the initial value will result in a final solid and liquid which are more nearly in equilibrium than were the original phases. For example, I may start with a crystallized mixture of components A B which occur in the ratio of 90 to 10, respectively, mixed with a mother liquor of 60 per cent A and 40 per cent B. If the 60–40 mixture is the equilibrium liquid for crystals having an 80–20 composition, the following would happen during one pressure fluctuation. Upon raising the pressure, the material which would crystallize from the mother liquor would have an 80–20 composition. This would dilute the 90–10 material to bring the overall composition of the crystal mass more nearly in equilibrium with the liquid. Upon reducing the pressure, the 90–10 composition crystals would melt in preference to the 80–20 crystals. This would bring the liquid and crystals still more nearly to equilibrium. By repeating the pressure fluctuation steps a sufficient number of times, the solid and liquid would attain perfect equilibrium.

By increasing pressure to bring about crystal formation and reducing the pressure to melt the crystals, a multi-stage crystallization process can be brought about without the addition and abstraction of heat, as is required in the usual crystallization processes.

My invention may be more clearly understood from an application of Gibb's phase rule which is stated as follows: $F=C-P+2$, where C is the number of components, P is the number of distinct phases, and F is the number of independent variables which must be stated in order to define the system. This may be applied to a binary mixture of solid solution-forming components as follows. The number of components is 2, the number of phases is 2 since I operate my process so that only liquid and solid phases are present. This means that there are two variables which must be defined for any mixture of the components wherein the solid and liquid are in equilibrium. There are three possible variables, pressure, temperature and composition. If one of these variables is fixed, the other two will change in an attempt to bring the system into equilibrium. In my process, I fix the pressure and allow the temperature and composition to shift. If I increase the pressure on a solid-liquid system not in equilibrium but which has an equilibrium, a certain amount of the material will be solidified according to the principle of Le Chatelier. The heat of fusion for the additional solid formed will be given up to the mixture. At the new temperature of the system, the composition of the components will have a new equilibrium. When the pressure is released, the reaction is reversed.

My invention will be more clearly understood when considered in connection with my apparatus as shown in the drawings. In the operation of that apparatus shown in Figure 1, the cylinder 13 is maintained liquid full at all times. The feed material is introduced into said cylinder through feed line 27. Heat is abstracted through the walls of cylinder 13 by circulating the refrigerating liquid through jacket 16. The amount of heat abstracted is sufficient to freeze only a portion of the mixture. This frozen material is moved through the crystallizer towards the warmer end, and thereby, an equal volume of liquid is displaced in the opposite direction. The solid being moved through the crystallizer from the cooler to the warmer ends is brought into contact with fresh feed or a new liquid which is richer with respect to that component being preferentially removed by crystallization than the liquid in which the solid formed. As the solid is brought into contact with new liquid, the pressure is alternately increased and decreased. Since the solid is not in equilibrium with the new liquid, increasing and reducing the pressure accelerates the approach to equilibrium conditions between the solid and liquid.

The material conveyor within my crystallizer may be a screw conveyor such as I have shown in Figure 3, or it may be any other equivalent means. It is preferable that there be a minimum amount of turbulence in the liquid since there will be a composition gradient throughout the body of the liquid. Also, the solid should be mixed as little as possible since that portion nearest the warm end of the crystallizer will be richest with respect to that component being preferentially removed by crystallization. If the crystalline material is loose and does not tend to stick or pack, a screw conveyor is an excellent means for moving the crystals since the only mixing that could occur in the solid is mixing of the individual portions that are caught between the threads of the screw. Any other means of moving the crystallized material through my apparatus must permit the maintenance of a composition gradient. Thus, the solid material becomes increasingly richer with respect to the higher-melting component as it approaches the warmer end of the apparatus and the liquid becomes increasingly richer with respect to the lower-melting component as it approaches the cooler end.

Since the cylinder is maintained liquid-full and is periodically under pressure, special means must be provided for introducing the feed. One such means is a tank such as I have shown as figure 32 with the outlet in the bottom. The tank is filled with feed material and pressure is applied. Check valve 29 is provided to prevent the reverse flow of material during the periods of high pressure in crystallizer 13. Other equivalent means may be used.

A convenient means for changing the pressure within my crystallizer is the use of a piston which is forced into the crystallizer to increase the pressure and is withdrawn to reduce the pressure. A convenient means of operating such a system is an air cylinder, which I have shown as figure 42.

As the pure material reaches the warmer end of the crystallizer, it is preferred to melt the solid and remove it as a liquid. For this purpose, I have provided a melter section, which is actually an extension of the crystallizer section. Any convenient means for adding heat to the melter section may be used. I have shown an electrical strip heater for this purpose. Another means would be a jacket in which heat transfer fluid is circulated.

In the apparatus which I have shown in Figure 1, the crystallizer is insulated and enclosed within an outer case. In order to reduce the amount of heat loss through this insulation to a minimum, it is necessary to prevent moisture from collecting within the insulating material container. I have shown a breather 24 which may contain any material suitable for dehydrating the air as it flows into the case surrounding the insulating crystallizer. There will be a minimum amount of air entering said container, but it is impractical to exclude air entirely.

The rate of pressure pulsations within the crystallizer and the speed of crystal transfer through the crystallizer are, of course, dependent upon the particular system involved. Each pulsation represents a freezing and melting stage and the number of such stages required is, of course, dependent on the amount of separation attained in each stage. The product removal can be continuous or the removal can be synchronized with the pulsations. In the latter instance, it is preferable to open the outlet lines at the period of lowest pressure. This makes the operation simpler.

In principle, the apparatus shown in Figure 4 operates the same as that shown in Figure 1. However, the operating procedure is somewhat different and can best be explained by reference to said figure. In this apparatus, a feed mixture enters the system at check valve 116, and passes into the cylinder of the feed injector and pulsator 117, which is shown in cross section as Figure 7. Piston 150 is caused to reciprocate in cylinder 151 by piston rod 126 which is, in turn, actuated by the crank and connecting assembly. As shown in Figure 7, the connection between the piston rod and the piston is not rigid but a certain amount of sliding motion is permitted. When the resistance to downward movement of piston 150 becomes greater than a certain amount, this downward movement slows or stops and spring 154 is compressed. Thus, during a downward stroke of the piston, pressure builds up to a predetermined level and then remains fairly constant for the remainder of the down stroke and for an equivalent part of the up stroke. By suitable choice of the length of piston stroke or size of piston and strength of spring 154, the ratio of time at high pressure to time at low pressure may be adjusted.

The feed stream leaves injector 117 and flows through heat exchanger 108 in indirect heat exchange contact with the product streams from the crystallizer and melter. The stream then flows through a second heat exchanger 107 in heat exchange relationship with the product outlet from crystallizer 81. The temperature of the feed as it leaves the second heat exchanger should be just above the temperature at which initial crystallization starts. If desired, a portion of the product from the crystallizer may be caused to by-pass heat exchanger 107. If additional cooling is required, a third heat exchanger can be placed in the feed line and a refrigerant liquid circulated therethrough. The cooled feed passes into conduit 83 which communicates with crystallizer 81 and melter 82. The fresh feed material entering this conduit is brought into contact with the solidified material from the crystallizer as it falls into the melter below. The operation of the crystallizer in this modification is similar to the operation previously described except the melting is accomplished in another section. As the liquid material flows through the crystallizer towards the product outlet 106, it is cooled by the abstraction of heat through the cooling jacket. The material frozen in the crystallizer is moved away from the product outlet towards the opposite end and that portion reaching the intake end of the crystallizer is caused to drop into the melter below.

The operation of melter 82 is similar to that of the crystallizer except that the solid material is moved toward the product outlet 112 and the liquid is moved toward the intake. Any solid reaching the product outlet 112 is substantially pure material comprising the higher-melting fraction, which will be the higher-melting component of a solid solution or the saturating component of a eutectic-forming mixture. If the feed is a binary mixture of solid solution-forming components, the product leaving the crystallizer through the outlet line 106 will be the lower-melting component in substantially pure form. However, if the materials do not form solid solution, the product leaving the crystallizer through the product outlet will be substantially pure eutectic for the components of the mixture.

The operation of the proportioning valves 111 and 113 is synchronized with the operation of feed injector and pulsator 117 so that the pressure is built up in the system and the product outlet lines are opened at just the right time and for the proper interval to permit the removal of a predetermined amount of each product. This is accomplished by means of the cams on drive shaft 122 which operates the crank and reciprocating rod assembly for the feed injector and pulsator.

In the apparatus shown in Figure 4, provision is made for applying heat throughout the length of the melter and abstracting heat throughout the length of the crystallizer. This is not always necessary. In some cases, all of the heat addition or all of the heat abstraction can be caused to occur at one end of the melter or crystallizer while the remainder of the apparatus operates adiabatically, similarly to the usual fractional distillation column. Theoretically, this requires a shorter phase exchanger section than if the heating and cooling is done differentially, as shown. However, since the shells of the melter and crystallizer serve as heat exchanger surfaces as well as pressure-tight vessel walls, the arrangement shown is more practical, for easier separation. For very difficult separations where long phase exchanger sections are needed, terminal heating and cooling wtih adiabatic sections will show an advantage. Under certain circumstances, independent control of the heat addition and abstraction at various sections of the melter and crystallizer, respectively, will be advantageous or necessary. This invention is not particularly concerned with the precise temperature history in the melter and crystallizer.

If the heating and cooling are done differentially, as shown in the diagram, the heat exchange fluids may conveniently be liquids, furnishing the necessary heating and cooling by sensible heat. This arrangement tends to keep T's more uniform along the heat exchange surface, thus preventing undesirably high rates of heat exchange at the terminal of the heat exchange systems. Power requirements are thereby kept at a minimum.

If the heating and cooling are done at the terminals only of the melter and crystallizer, and the phase exchange is carried out adiabatically, the primary refrigerant may be used directly, being evaporated in the cooling end and being condensed in the heating end of the melter.

My invention is particularly adapted to separating the components of solid solution-forming mixtures, which theoretically require a plurality of freezing and melting stages. For mixtures which do not form solid solutions, my process rapidly frees the crystals of any occluded or trapped mother liquor. During the melting part of the cycle, the smallest and most needle-like crystals will melt preferentially. During the freezing part, the largest crystals will grow preferentially. Thus, the crystalline mesh that causes entrapment of mother liquor is rapidly destroyed and the crystals are freed of said mother liquor.

My invention can, in general, be used for any separation that can be accomplished by crystallization. However, the invention can also be applied to materials which form amorphous solids upon solidification. This includes the purification of fats and oils such as oleomargarine, and other jelly-like materials.

Certain modifications may be made in my process or certain substitution of equivalents may be made in the apparatus without departing from the spirit and scope of the invention, which is defined by the following claims.

Having described my invention, I claim:

1. A method of accelerating the approach toward equilibrium between solid and liquid phases of the same components in contact with each other, which comprises the steps of subjecting a confined body of the solid-liquid mixture to a pulsating pressure to alternately solidify and melt portions of the mixture while countercurrently contacting said solid and liquid phases, said mixture being at a temperature at which said liquid and solid phases can exist where said two phases are in contact.

2. The method of separating a mixture of compounds into higher-melting and lower-melting fractions which comprises the steps of maintaining an elongated, confined body of the mixture to be separated; maintaining a temperature differential between the ends of said body; maintaining within said body a temperature such that a portion of said mixture can be made to solidify by the application of pressure to said body; subjecting said body to a pulsating pressure to cause portions of said mixture to solidify and portions of said solid to melt; moving the solid so formed towards the warmer end of said body, thereby displacing liquid towards the colder end of said body; withdrawing a higher-melting fraction of said mixture from the warmer end of said body; and withdrawing a lower-melting fraction of said mixture from said colder end.

3. The method of separating a solid solution-forming mixture into its components which comprises maintaining a confined, elongated body of the mixture; maintaining a temperature at one end of said body at the melting point of the higher-melting component and a temperature at the opposite end at the melting point of the lower-melting component; subjecting said body to a pulsating pressure to cause portions of the mixture to solidify and remelt; moving the solid in discrete portions towards the warmer end of said body, thereby displacing liquid towards the colder end; removing from the warmer end a fraction comprising the higher-melting component; and removing from the colder end a fraction comprising the lower-melting fraction.

4. A method of separating a binary mixture whose components are completely miscible in the liquid and solid phases which comprises the steps of maintaining a confined, elongated body of the mixture; maintaining one end of said body at a temperature below the melting point of the higher-melting component but above the melting point of material having less than a predetermined content of the higher-melting component; maintaining the opposite end of said body at such a temperature that the lower-melting component of less than a predetermined purity with respect to the lower-melting component will be solid but material having said purity will be liquid; subjecting said confined body to a pulsating pressure to alternately solidify and melt a portion of said mixture, moving the solidified material towards the warmer end of said body, thereby causing a liquid to flow towards the cooler end of said body; removing a fraction comprising the higher-melting component from the warmer end of said body and a second fraction comprising the lower-melting component from the cooler end of said body.

5. A pressure separator for separating by fractional crystallization and melting of the type described which comprises, in combination, a closed, elongated tube, each end of said tube having a product outlet, a feed inlet intermediate the product outlets, means for abstracting heat from a portion of said tube between the feed inlet and one end, means for moving solid granular material through said tube, and a pulsating pressurizer for increasing and reducing the pressure within said tube.

6. A pressure separator for separating by fractional crystallization and melting which comprises, in combination, a closed cylinder having an outlet adjacent each end and a feed inlet intermediate said ends, said cylinder comprising a freezing zone, an intermediate separation zone and a melting zone; cooling means for abstracting heat from said freezing zone; a conveyor screw extending through said freezing and separating zones for moving solid granular material from said freezing and said separating zones into said melting zone; means for adding heat to said melting zone for melting the solid from said separating zone; a piston extending into said cylinder for increasing and reducing the pressure on the liquid within said cylinder; and means for introducing a feed mixture into said cylinder.

7. A pressure separator for separating by fractional crystallization and melting of the type described which comprises, in combination, a closed, elongated cylinder having a feed inlet intermediate the ends and a product outlet adjacent each end; a cooling jacket around a portion of said cylinder between said feed inlet and the end; a means for moving granular material through said cylinder from the jacketed end to the opposite end of said cylinder; means for melting the solid granular material as it reaches the end of said cylinder, a product outlet for removing the melted material, and a pulsating pressurizer for increasing and reducing the pressure within said cylinder.

8. A pulsating separator for separating by fractional crystallization and melting of the type described which comprises, in combination, an elongated cylinder having product outlets adjacent each end of said cylinder and a feed inlet in an intermediate portion; a cooling jacket around a portion of said cylinder between the feed inlet and the end of said cylinder; an auger longitudinally disposed within said tube for moving granular material through said cylinder; and a pulsating pressurizer for increasing and reducing the pressure in said cylinder.

9. A pressure separator for separating by fractional crystallization and melting comprising, in combination, a separating zone and a melting zone in communication therewith; a product outlet adjacent a closed end of said separating zone; a feed inlet intermediate the ends; a cooling jacket surrounding at least a portion of said separating zone; means for moving solid granular material through said separating zone in a direction away from the product outlet thereof; means for supplying heat to said melting zone, a second product outlet adjacent the end of said melting zone opposite the point of communication with said separating zone; means for increasing and reducing the pressure within said apparatus; and means for controlling the flow of material through said product outlets.

10. A pressure separator for separating by fractional crystallization and melting comprising a closed elongated chamber having a product outlet adjacent each end, said chamber comprising a separating zone and a melting zone; means for abstracting heat from a portion of said separating zone; means for introducing a liquid feed into said separating zone; a conveyor for moving solid granular material through said separating zone into said melting zone; means for adding heat to said melting zone, a piston adapted to slide into and out of said chamber to increase and reduce the pressure within said apparatus; and means for actuating said piston.

11. In a pressure separator for separating by fractional crystallization and melting of the type described, a pressure control means which comprises a feed injector in the feed line to said system and a proportioning valve in each of the product outlet lines; said injector comprising a cylinder, an intake thereto, a check valve in said intake, an outlet from said cylinder having a conduit connection with the feed intake of said crystallizer; a piston slideable within said cylinder, a drive shaft, a crank secured thereto, and a pitman connection to said crank and slidably connected to said piston; each of said proportioning valves comprising a body having an internal passageway therethrough and forming an internal cylinder, a check valve in the inlet to said passageway, a spring-biased piston slideable within said cylinder, means for adjusting the tension on said spring, a plug valve closing the outlet of said cylinder and having a stem extending to the exterior, a spring biasing said plug valve in closed position, a cam mounted on said drive shaft and engageable with the stem of said plug valve; the operation of said proportioning valves being synchronized with the operation of said injector to close the product outlet lines and cause a pressure increase and to open said outlets to release the predetermined amount of product at the predetermined stage of the cycle.

12. A pressure separator for separating by fractional crystallization and melting which comprises a closed, jacketed cylinder having a product outlet in one end for removing a lower-melting fraction, and conveyor means for moving solid granular material through said cylinder in a direction away from said outlet; a melting chamber positioned below said crystallizing chamber which comprises a closed jacketed cylinder having a product outlet in one end for removing a higher-melting fraction, and conveyor means for moving solid granular material through said melting chamber in a direction towards the product outlet thereof; a communicating conduit connecting said crystallizing and said melting chambers at a position near the ends opposite the product outlets of each; means for circulating a cooling fluid through the jacket of said crystallizing chamber and a heating fluid through the jacket of said melting chamber; a feed injector for injecting the feed material into said crystallizer and controlling the pressure therein; a feed conduit connecting the outlet of said feed injector with an intermediate portion of said communicating conduit between said crystallizing and said melting chambers; a proportioning means for controlling the ratio of higher-melting fraction removed from said melting chamber to the lower-melting fraction removed from said crystallizing chamber; and a heat exchanger for establishing indirect heat exchange contact between the feed material in said feed conduit and the product in the respective product outlet lines.

13. A pressure separator for separating by fractional crystallization and melting comprising, in combination, a separating section and a melting section; means for maintaining a temperature gradient throughout said sections comprising a cooler in heat exchange with at least a portion of said separating section, and a heater in heat exchange with said melting section; a product outlet adjacent said cooler; means for introducing feed material into said sections; means for moving solid granular material through said sections in a direction away from the above mentioned product outlet; a second product outlet adjacent said heater; and means for increasing and reducing the pressure within said apparatus.

14. A pressure separator for separating by fractional crystallization and melting comprising, in combination, a separating section and a melting section; means for maintaining a temperature gradient throughout said sections comprising a cooler in heat exchange with said separating section, and a heater in heat exchange with said melting section; a product outlet adjacent said cooler; means for introducing feed material into said sections; means for moving solid granular material through said sections in a direction away from the above mentioned product outlet; a second product outlet adjacent said heater; and means for increasing and reducing the pressure within said apparatus.

15. Apparatus comprising in combination a closed shell, means for maintaining a temperature gradient within the chamber formed by said shell, means for applying pulsating pressure to said chamber, a feed material inlet to said chamber, a product outlet from the warmer portion of said chamber and a second product outlet from the cooler portion of said chamber.

16. Apparatus comprising in combination a closed shell, means for maintaining a temperature gradient lengthwise of said chamber formed by said shell, means for applying pulsating pressure to said chamber, a feed material inlet to said chamber, and a product outlet from each end portion of said chamber.

17. Apparatus comprising in combination a closed shell, means for maintaining a temperature gradient within the chamber formed by said shell, means for moving solid material through said chamber, means for applying pulsating pressure to said chamber, a feed material inlet to said chamber, a product outlet from the warmer portion of said chamber, and a second product outlet from the cooler portion of said chamber.

18. Apparatus comprising a crystallizer, a melter in communication with said crystallizer, means for applying pulsating pressure to said crystallizer and melter, a feed material inlet to said apparatus, and a product outlet from each of said crystallizer and said melter.

19. Apparatus comprising a crystallization section, a melting section in communication with said crystallization section, means for moving solid material from said crystallization section toward said melting section, means for applying pulsating pressure to said sections, a feed material inlet to said apparatus, and a product outlet from each of said crystallization zone and said melting zone.

20. The separation of a multi-component material by solid particle formation; comprising maintaining a solid particle forming zone liquid full of said multi-component material, applying intermittent pressure to said system, and recovering at least two product streams.

21. The separation of multi-component material by solid particle formation, comprising introducing said material into a partial solidification zone, moving solid particles from said partial solidification zone toward a melting zone, applying intermittent pressure to said zones, and recovering at least two product streams.

22. The separation of multi-component material, comprising subjecting a solid-liquid system to intermittent pressure to cause the alternate freezing of liquid and melting of solid, removing liquid impurities and recovering a purer product from said system.

References Cited in the file of this patent

UNITED STATES PATENTS

| | | |
|---|---|---|
| 2,168,141 | Schutte | Aug. 1, 1939 |
| 2,297,786 | Lindblom | Oct. 6, 1942 |
| 2,400,883 | Keeling | May 28, 1946 |
| 2,540,977 | Arnold | Feb. 6, 1951 |
| 2,603,667 | Pankrantz | July 15, 1952 |
| 2,613,136 | McKay | Oct. 7, 1952 |
| 2,615,794 | Shelby | Oct. 28, 1952 |
| 2,617,273 | Findlay | Nov. 11, 1952 |
| 2,617,274 | Schmidt | Nov. 11, 1952 |
| 2,659,761 | Frevel | Nov. 17, 1953 |